United States Patent [19]

Herzig et al.

[11] Patent Number: 5,395,602
[45] Date of Patent: Mar. 7, 1995

[54] METHOD FOR THE PRODUCTION OF SODIUM PERBORATE HYDRATE GRANULATES

[75] Inventors: Joerg Herzig, Maintal; Wolfgang Zikofsky, Ronneburg; Birgit Bertsch-Frank; Thomas Lieser, both of Hanau, all of Germany

[73] Assignee: Degussa Aktiengesellschaft, Frankfurt am Main, Germany

[21] Appl. No.: 628,913

[22] Filed: Dec. 18, 1990

[30] Foreign Application Priority Data

Dec. 19, 1989 [DE]  Germany .................. 39 41 851.0

[51] Int. Cl.⁶ .................... C01B 15/12; C22B 1/14
[52] U.S. Cl. ................... 423/279; 23/313 R; 264/118; 423/281
[58] Field of Search ........... 423/279, 281; 23/313 R; 264/118

[56] References Cited

U.S. PATENT DOCUMENTS

| | | | |
|---|---|---|---|
| 338,924 | 3/1886 | Carson et al. | 264/109 |
| 1,076,039 | 10/1913 | Jacobs | 423/281 |
| 2,863,835 | 12/1958 | Goldsmith et al. | 423/281 |
| 3,555,696 | 1/1971 | Pistor et al. | |
| 4,002,434 | 1/1977 | Simmerbach et al. | |
| 4,115,519 | 9/1978 | Brichard et al. | |
| 4,185,960 | 1/1980 | Brichard et al. | |
| 4,215,097 | 7/1980 | Brichard et al. | |
| 4,320,105 | 3/1982 | Nelli et al. | 423/421 |
| 4,681,748 | 7/1987 | Doetsch et al. | |
| 4,968,500 | 11/1990 | Bertsch-Frank et al. | 403/281 |
| 5,108,726 | 4/1992 | Baldwin et al. | 423/279 |

FOREIGN PATENT DOCUMENTS

| | | |
|---|---|---|
| 0202518 | 11/1985 | European Pat. Off. . |
| 0194952 | 9/1986 | European Pat. Off. . |
| 0202519 | 11/1986 | European Pat. Off. . |
| 0295950 | 12/1988 | European Pat. Off. . |
| 0296813 | 12/1988 | European Pat. Off. . |
| 0328768 | 8/1989 | European Pat. Off. . |
| 2258319 | 6/1974 | Germany . |
| 2444780 | 4/1976 | Germany . |
| 2652488 | 3/1983 | Germany . |

*Primary Examiner*—Wayne Langel
*Attorney, Agent, or Firm*—Beveridge, DeGrandi, Weilacher & Young

[57] ABSTRACT

The invention relates to sodium perborate hydrate granulates and a method for producing sodium perborate hydrate granulates with an available oxygen content of 14 to 18% by weight, especially 15 to 16% by weight; an abrasion index according to ISO test 5937 of not more than 10%; with a rate of dissolution of below 1.5 minutes, preferably below 1.0 minutes (for 1 gram of the granulate in 500 cm³ water, at 15° C.); and with a bulk weight in the range of 0.6 to 1.2 kg/dm³. The sodium perborate hydrate granulate can be produced by compacting spray-dried, essentially amorphous sodium perborate hydrate starting material which exhibits a bulk weight below that of the granulate product, and a particle size of 90% less than 100 micrometers. The hydrate starting material is further characterized in that it loses 0.2 to 2.0% of its weight when stored at 60° C. and 100 Pa for 30 minutes. The starting material is compacted between rollers at a contact pressure of $5 \times 10$ to $2 \times 10^4$ N/cm, and the resultant product is comminuted and the granulate is sieved according to particle size. The compacted granulate particles may be rounded off by means of a mechanical stressing prior to the sieving step. This method produces granulates with the above-mentioned characteristics which are desired in the market. The granulates are produced in a simple manner, without thermal stressing of the perborate.

8 Claims, No Drawings

METHOD FOR THE PRODUCTION OF SODIUM PERBORATE HYDRATE GRANULATES

BACKGROUND OF THE INVENTION

This invention relates to a method for the production of sodium perborate hydrate granulates with an available oxygen content (Oa) of 14 to 18% by weight. More particularly, the invention relates to a method of producing sodium perborate monohydrate granulate with an available oxygen content of 15 to 16% by weight; with a bulk weight from 0.6 to 1.2 kg/dm$^3$; an abrasion index according to ISO test 5937 of not more than 10%; and a rate of dissolution below 1.5 minutes for 1 gram of granulate with granularity in the range of 0.2 to 0.8 mm in 500 cm$^3$ water at 15° C. The method of the invention includes compressing and granulating a sodium perborate hydrate starting material with a bulk weight lower than that of the granulate product. Another aspect of the invention includes the granulate products with the properties specified above, which are obtained in accordance with the method of the invention.

The term sodium perborate hydrates signifies compounds of the general formula:

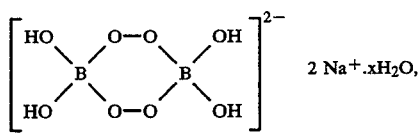

$$2\ Na^+ \cdot xH_2O,$$

wherein x is 6 for the product customarily designated in the art as sodium perborate tetrahydrate, and x is 0 for the product with 16% by weight available oxygen (Oa) designated in the art as sodium perborate monohydrate. Perborates known as super-oxidized perborate hydrates with an Oa content above 16% by weight are also known; however, the structure of these super-oxidized perborate hydrates does not appear to be well established. Therefore, the granulates with an available oxygen content (Oa) of 14 to 18% by weight, which are produced in accordance with the invention, may include different structures, although sodium perborate monohydrate constitutes the main product.

Sodium perborate hydrates with an available oxygen content in the range of 14 to 18% by weight, especially sodium perborate monohydrate with Oa=15 to 16% by weight, are becoming increasingly more important because of their high available oxygen content, which is greater than that of the tetrahydrate product. The sodium perborate monohydrate product also exhibits a higher rate of dissolution than the tetrahydrate product. In addition, in order to make for low-dust pneumatic conveyance, a high abrasion resistance and as high a bulk weight as possible are required of the perborates. This low-dust characteristic is important to enable the use of the products in so-called detergent volume concentrates.

The production of products with the above-mentioned properties is problematic, because the material properties of abrasion resistance, rate of dissolution and bulk weight are in part inversely dependent upon one another, i.e. creating a product which maximizes one of the properties tends to adversely affect the other properties.

Perborate monohydrate prepared by means of the dehydration of crystalline perborate tetrahydrate does exhibit the desired rate of dissolution, i.e., under 1.5 minutes for 1 gram in 500 cm$^3$ water at 15° C.; however, this product is not very abrasion-stable and, in addition, only bulk weights below 0.6 kg/dm$^3$ are available. Maintaining special dehydration conditions can increase the abrasion resistance, but the bulk weight is not significantly increased, cf. DE-PS 22 58 319, DE-PS 24 44 780, EP-A 194,952, EP-A 202,519. The perborate monohydrate granulates obtained according to EP-A 202,518, EP-A 295,950 and EP-A 296,813 contain heterogeneous binding agents such as sodium silicate and carboxylic acid compounds; however, these products do not exhibit the required properties for the granulate described above.

An attempt has also been made to further improve the abrasion resistance of perborate monohydrate by means of moistening and drying, as disclosed in U.S. Pat. No. 4,002,434. However, while the rate of dissolution does remain high and the bulk weight does not change significantly, it has been noted that the abrasion resistance of the resulting products no longer meets current standards. Sodium perborate monohydrate granulates containing zeolites, as disclosed in DE-PS 26 52 488, with a variably adjustable rate of dissolution, abrasion resistance and bulk weight are known; however, the mandatory presence of large amounts of zeolite lowers the Oa content and limits the possibilities for use of this composition.

It is possible, according to the methods of U.S. Pat. No. 4,115,519 and U.S. Pat. No. 4,185,960, to produce abrasion-resistant, granular sodium perborate monohydrate and perborate hydrate with an Oa value above 16% by spraying an aqueous solution of hydrogen peroxide and a solution of sodium metaborate into a fluid-bed dryer containing nuclei with a diameter smaller than the granulate to be produced. An abrasion-resistant granulate with a high bulk weight is produced in this manner; however, this method forms a product wherein the rate of dissolution is reduced considerably compared to perborate monohydrate prepared by dehydration. This unsatisfactory rate of dissolution may be improved somewhat by means of the simultaneous use of a tenside or surface active agent as in the previously mentioned production method, cf. U.S. Pat. No. 4,215,097. But, granulates with a rate of dissolution below 1.5 minutes for 1 gram of the granulate in 500 cm$^3$ water at 15° C. were not able to be produced in any manner, as shown in the examples in U.S. Pat. No. 4,215,097.

European Patent Application 328,768 teaches another method for the production of sodium perborate granulates with Oa values of preferably 14 to 16% by weight, a high bulk weight, a high rate of dissolution and an abrasion in the range of the marketed products which are to be produced. In this method, essentially amorphous primary particles which are obtained in the absence of nuclei by means of spray drying are supplied immediately upon leaving the drying zone to a granulating device and granulated in the presence of free and/or perborate crystal water. It was pointed out in this document that perborate hydrate granulates with bulk densities of up to 1.0 g/ml can be produced by using a fairly high-compressing granulating device, e.g. a continuously operating mixer or a drum with revolving blades or worms. It was considered to be essential in EP-A 328,768 that the granulation be carried out immediately following the formation of the primary particles by spray drying.

It was determined that commercially available sodium perborate monohydrate obtained by dehydration with a bulk weight of approximately 550 g/dm$^3$ cannot be satisfactorily compacted using a roller compactor, nor can a granulate be obtained from the dehydrated shell product. The shell product yield is very small, approximately less than 5%, and, in addition, only a slight increase in the bulk weight can be obtained. Furthermore, the tendency of the granulates to adhere to the rollers constitutes an additional problem.

SUMMARY OF THE INVENTION

It is one objective of this invention to provide a method for the production of sodium perborate hydrate granulates with an available oxygen content (Oa) of 14 to 18% by weight; an abrasion index according to ISO test 5937 of not more than 10%; a rate of dissolution below 1.5 minutes for 1 gram of the granulate with granularity of 0.2 to 0.8 mm in 500 cm$^3$ water at 15° C.; and a bulk weight from 0.6 to 1.2 kg/dm$^3$. This hydrate granulate is produced from sodium perborate hydrate with a lower bulk weight. Furthermore, the method can be carried out in a simple manner.

Moreover, the method may be carried out without the use of heterogeneous auxiliary agents, such as auxiliary granulating agents. In addition, there is no need to directly couple the formation of primary particles by a spray drying method with further granulating steps.

It is another objective of this invention to provide a granulate product with the above properties, obtainable in accordance with the method of this invention.

DESCRIPTION OF THE INVENTION

The production of sodium perborate hydrate granulates with the above-mentioned properties is accomplished by the following method: spray-dried, essentially amorphous sodium perborate hydrate exhibiting an Oa content of 14 to 18% by weight, a particle size of 90% less than about 100 μm, a rate of dissolution below 1 minute, and a weight loss of about 0.2 to 2.0% by weight determined by means of 30 minutes storage at 60° C. and 100 Pa, is compacted between rollers at a contact pressure of about $5 \times 10^3$ to $2 \times 10^4$ N/cm. The shells so produced are comminuted, and the granulate obtained thereby may be optionally mechanically post-treated to round off the granulate grains. This product is then sieved according to particle size. Other features of the invention relate to more specific embodiments of the method, as well as to the granulate products obtained in accordance with the method.

It is unexpected that by using the method of this invention, all of the desired material properties, namely a high Oa value, a high rate of dissolution at 15° C., a low abrasion, and a high bulk weight, can be reliably produced within the above-mentioned limits. Not only granulates with a bulk weight from about 0.6 to 1.0 kg/dm$^3$ may be obtained, but also granulates with a bulk weight from 1.0 to 1.2 kg/dm$^3$ are produced by the method in accordance with this invention.

The result of the method of the invention, as shown in Examples 1 to 4, is unexpected, especially in view of the unsatisfactory results achieved by roller compacting sodium perborate monohydrate obtained by means of dehydration of sodium perborate tetrahydrate, as shown in Reference Examples 1 and 2.

The compaction takes place between two rotating rollers. Several roller pairs can also be operated in series. The surface structure of the rollers may be smooth or it may exhibit a fine grooving. The contact pressure of the rollers is in a range of about $5 \times 10^3$ N/cm to $2 \times 10^4$ N/cm, and preferably between about $1.0 \times 10^4$ and $1.8 \times 10^4$ N/cm. As the contact pressure increases, the bulk weight of the granulated product is also increased.

It is surprising, however, that in spite of the high compression, the rate of dissolution of the granulate still remains below 1.5 minutes, and preferably even under 1 minute, for 1 gram of the granulate in 500 cm$^3$ water at 15° C. The compaction takes place at room temperature or at the temperature occurring due to friction between the compacting rollers, for example, from about 30° to 35° C. If necessary, the rollers may be cooled. Non-compressed or already pre-compressed, spray-dried material can be supplied to the actual roller compactor. Compressor worms and/or devices with vacuum venting, for example, are suitable for the precompression steps.

The roller compaction is followed by comminution of the obtained shells to the desired size, which is followed by sieving to the various grain sizes of the granulate, for example, by using sieving and classifying devices. Oversized granulates are broken down further, and undersized granulates fed back to the compacting device. It is especially advantageous to separate the oversized granulate by means of sieving and to subsequently round off the granulate under moderate mechanical forces, for example, in a revolving tube or a fluid bed, and to free the granulates of adhering dust in classifying devices. Simple knife or blade mechanisms, mills or crushers are suitable for the comminution of the shells; perforated-basket granulators are particularly preferred. If desired, the granulate can be subsequently dried.

The initial spray-dried perborate hydrate starting material which is to be granulated includes amorphous spray-dried particles with an Oa content of 14 to 18% by weight. Preferably, the initial starting material is sodium perborate monohydrate with an Oa content of 15 to 16% by weight. The bulk weight of the initial particles to be granulated is below that of the granulates which are to be produced. Preferably, the bulk weight of the starting material is below 600 g/dm$^3$, and even more preferably, between 100 and 500 g/dm$^3$. One gram of the particles to be used as the starting material dissolves completely under agitation at 15° C. in less than 1 minute in 500 cm$^3$ water. At least 90% of the particles should be smaller than 100 micrometers.

One important parameter of the starting particles is the weight loss characteristics of the particles within 30 minutes during storage at 60° C. and 100 Pa. This weight loss most likely involves the loss of water, and to a certain extent, if applicable, also the loss of hydrogen peroxide and oxygen. Preferably, sodium perborate monohydrate with a weight loss in a range of 1.0 to 1.8% by weight is used. Suitable for this purpose are perborate hydrates such as those obtained by spray drying according to EP-A 328,768. Also suitable are products obtainable according to the method discussed therein with an Oa content of 16 to 18% by weight, which can be produced by increasing the $H_2O_2/NaBO_2$ ratio of the spray solution, provided that the drying is carried out so that the indicated weight loss characteristic is obtained. The term "essentially amorphous" is intended to mean that practically no signs indicative of crystalline areas can be recognized in X-ray diffraction patterns of powders with $CuK_{\alpha}$ radiation.

The method of the invention is not only simple to carry out, but it also enables the reduction of thermal stressing of the perborate to be granulated, as compared to the method described in EP-A 328,768. The properties of the granulates produced in accordance with the method of this invention correspond to consumer and market requirements.

The abrasion index of the granulates is determined according to ISO test 5937 (1980), and the bulk weight is determined according to ISO test 3424. The available oxygen content can be determined by titration with a $KMnO_4$ standard solution, by techniques known to those skilled in the art. The test for determining the rate of dissolution, which is preferably pursued in a conductometric manner, takes place in a beaker at 15° C. under agitation with a blade agitator at 330 rpms, during which time the initial product to be granulated is directly added to the beaker. To determine the rate of dissolution of the products granulated in accordance with the invention, the same process conditions are used, i.e. 15° C., with a blade agitator at 330 rpms, and a particle size fraction in a range of 0.2 to 0.8 mm is added to the beaker.

The invention is more fully described in the following examples and reference examples. These examples are intended to only illustrate the invention and should not be construed as limiting the same.

REFERENCE EXAMPLES

REFERENCE EXAMPLE 1

A roller compactor is supplied with commercially available sodium perborate monohydrate which was obtained by dehydration of sodium perborate tetrahydrate. The sodium perborate monohydrate had an Oa content of 15.4%, a bulk weight of 530 g/dm$^3$, a drying loss of 0.9% by weight (conditions: 30 minutes, 60° C., 100 Pa) and a particle size range of 10% <200 micrometers and 10% >700 micrometers. The roller compactor is a laboratory compactor type L 200/50, available from Bepex. A low compression yield was obtained, the yield being below 5%.

REFERENCE EXAMPLE 2

The sodium perborate monohydrate of Example 1 was compacted using a roller press, the roller press being type WP 50N available from Alexanderwerk, with a horizontal worm dosage, a spring-mounted roller arrangement with smooth rollers having a cross grooving at a contact pressure of $3 \times 10^3$ N/cm. The test had to be interrupted after a short period of operation because of incipient adhesion effects of the monohydrate to the roller. A higher contact pressure increased the tendency of the monohydrate to adhere. The sodium perborate product obtained prior to the termination of the test was comminuted in a sieve granulator and fractionated. The abrasion index according to ISO test 5937 ( 1980 ) was 17%.

EXAMPLES 1 TO 4

Table I shows the data relating to the sodium perborate monohydrate granulate produced in Examples 1–4, which are produced in accordance with the invention.

The first section of the Table shows the active oxygen content, bulk weight and percent weight loss after 30 minutes at 60° C. and 100 Pa pressure for the initial sodium perborate monohydrate starting material.

Essentially amorphous sodium perborate monohydrate obtained by spray drying is used as the starting material. The starting material may be produced according to the first method step disclosed in EP-A 328,768.

The compaction operating conditions for the various examples are shown in the second section of Table I. The initial starting material is compacted in a laboratory compactor, such as the type L 200/50 available from Bepex which is equipped with smooth rollers with cross grooving and a precompressor worm as the material-supply device. The resulting product from compaction was comminuted in a perforated basket granulator, such as the type MG 205, available from Freiwitt, to the desired particle size. The material was then sieved with a vibrating screen. The granulate is obtained from the screened product by swirling the screened product and producing swirling layers of adhering dust and granulate, and separating the monohydrate granulate from the swirling dust. The third section of the Table shows the material data of the granulate product formed in the particle size range of about 0.2 to 0.8 mm.

The initial spray-dried sodium perborate monohydrate starting material used in the Examples 1–4 had a $d_{50}$ value in a range of about 30 to 40 micrometers and a rate of dissolution less than 1 minute (15° C.; 1 g/500 ml).

TABLE I

| | Example 1 | Example 2 | Example 3 | Example 4 |
|---|---|---|---|---|
| Spray-dried sodium perborate monohydrate | | | | |
| Oa-Content (% by weight) | 15.3 | 15.6 | 15.5 | 15.8 |
| Bulk Weight (g/dm$^3$) | 265 | 280 | 310 | 350 |
| Weight loss (%) (30 Min., 60° C., 100 Pa) | 0.3 | 0.8 | 1.2 | 1.6 |
| Compacting Conditions | | | | |
| Throughput (kg/hour) | 80 | 120 | 40 | 40 |
| Contact Pressure (kN/cm) | 12 | 16 | 18 | 18 |
| Roller Temperature | 30–34 | 30–34 | 30–34 | 30–34 |
| Sodium Perborate monohydrate granulate | | | | |
| Oa-Content (% by weight) | 15.3 | 15.6 | 15.4 | 15.6 |
| Bulk Weight (g/dm$^3$) | 770 | 810 | 845 | 910 |
| Rate of Dissolution (Min.) | 1 | 1 | 1 | 1.0 |
| Abrasion Index (ISO 5937) (%) | 9.9 | 8.0 | 7.5 | 6.0 |
| Grain Spectrum (mm) | 0.2–0.8 | 0.2–0.8 | 0.2–0.8 | 0.2–0.8 |
| BET-surface (m$^2$/g, N$_2$) | 3.7 | 2.4 | 2.1 | 1.6 |

We claim:

1. A method for the production of sodium perborate monohydrate granulates with an atom ratio of sodium to boron of 1:1 and an available oxygen content (Oa) of 14 to 18% by weight; an abrasion index according to ISO test 5937 of not more than about 10%; a rate of dissolution of below about 1.5 minutes for 1 gram of the granulate with a particle size from about 0.2 to 0.8 mm in 500 cm$^3$ water at 15° C.; and a bulk weight in the range of about 0.6 to 1.2 kg/dm$^3$, comprising the steps of:

compacting a spray-dried, essentially amorphous sodium perborate monohydrate having an atom ratio of sodium to boron of 1:1 and an available oxygen content of 14 to 18% by weight; a particle size of 90% less than 100 μm; a rate of dissolution below 1 minute for one gram of the perborate monohydrate in 500 cm$^3$ water at 15° C.; and a weight loss in the range of about 0.2 to 2.0% by weight, when stored for 30 minutes at 60° C. and 100 Pa; wherein the compacting step takes place between rollers at a contact pressure of about $5 \times 10^3$ to $2 \times 10^4$ N/cm;

comminuting the compacted product to provide the sodium perborate granulate product; and sieving the sodium perborate granulate product according to particle size.

2. The method according to claim 1, wherein the bulk weight of said spray-dried, essentially amorphous sodium perborate monohydrate is less than about 600 g/dm$^3$.

3. The method according to claim 2, wherein the bulk weight of said spray-dried, essentially amorphous sodium perborate monohydrate is in the range of about 100 to 500 g/dm$^3$.

4. The method according to claim 2, wherein the granulate product obtained from the comminuting step is further rounded off under mechanical stressing prior to the sieving step.

5. The method according to claim 1, wherein the spray-dried sodium perborate monohydrate has an available oxygen content in the range of about 15 to 16% by weight.

6. The method according to claim 1, further comprising precompressing the spray-dried sodium perborate monohydrate prior to the compacting step, wherein the precompressing step is performed by a compressor worm and/or vacuum venting.

7. The method according to claim 1, wherein the contact pressure of the rollers during the compacting step is in the range of about $1 \times 10^4$ to $1.8 \times 10^4$ N/cm.

8. Sodium perborate monohydrate granulates with an atom ratio of sodium to boron of 1:1 and an available oxygen content of 14 to 18% by weight; an abrasion index according to ISO test 5937 of not more than about 10%; a rate of dissolution of below about 1.5 minutes for 1 gram of the granulate with a particle size in the range of about 0.2 to 0.8 mm, in 500 cm$^3$ water, at 15° C.; and a bulk weight in the range of about 0.6 to 1.2 kg/dm$^3$, made by a process comprising the steps of:

compacting a spray-dried, essentially amorphous sodium perborate monohydrate having an atom ratio of sodium boron of 1:1 and an available oxygen content of 14 to 18% by weight; a particle size of 90% less than 100 μm; a rate of dissolution below 1 minute for one gram of the perborate monohydrate in 500 cm$^3$ water at 15° C.; and a weight loss in the range of about 0.2 to 2.0% by weight, when stored for 30 minutes at 60° C. and 100 Pa; wherein the compacting step takes place between rollers at a contact pressure of about $5 \times 10^3$ to $2 \times 10^4$ N/cm;

comminuting the compacted product to provide the sodium perborate granulate product; and sieving the sodium perborate granulate product according to particle size.

* * * * *